Patented July 15, 1941

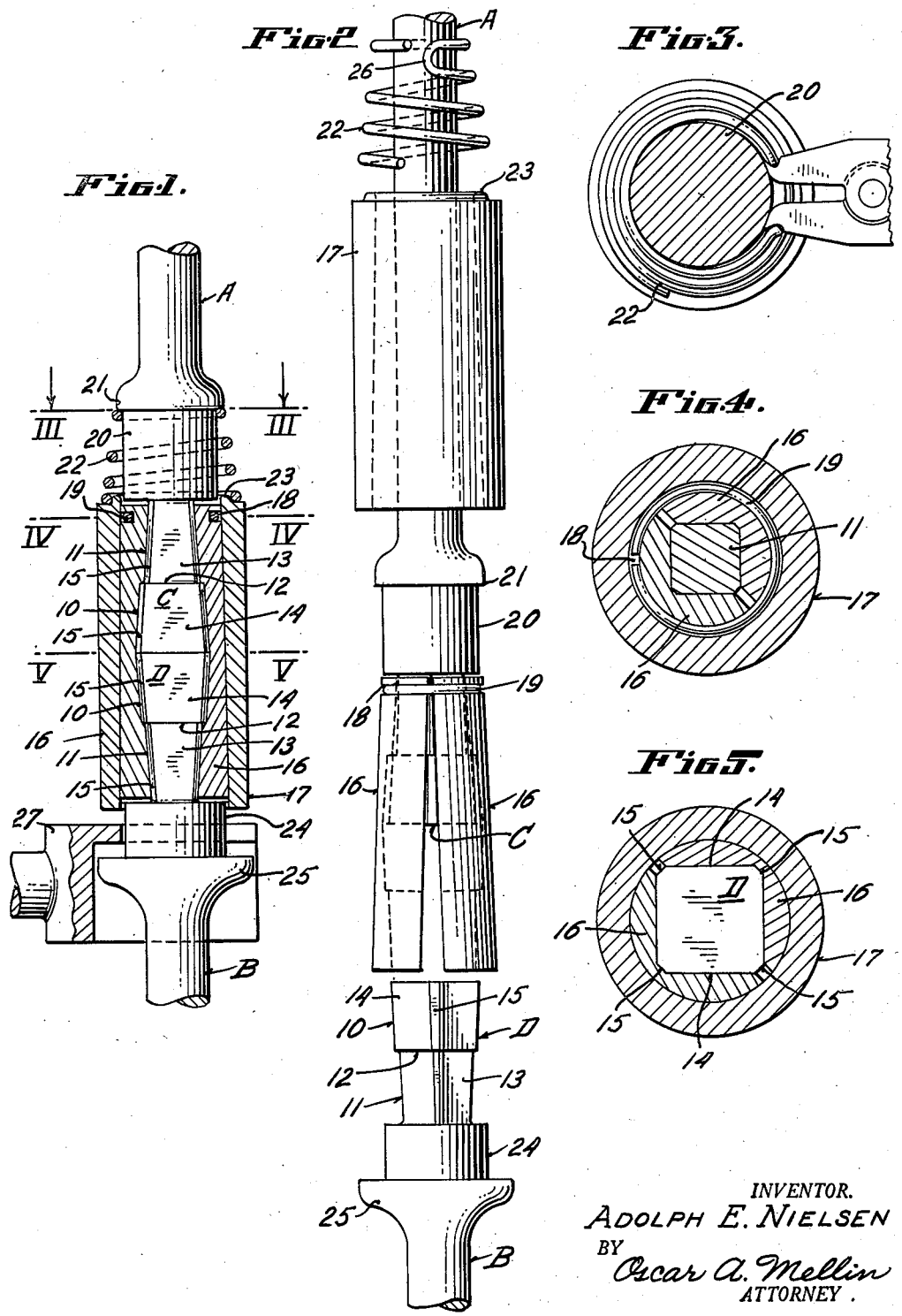

2,249,162

UNITED STATES PATENT OFFICE 2,249,162

THREADLESS INTERLOCKING COUPLING

Adolph E. Nielsen, Alameda, Calif.

Application May 26, 1939, Serial No. 275,784

3 Claims. (Cl. 287—111)

This application is a continuation in part of my pending application entitled "Threadless interlocking coupling," filed March 27, 1937, and bearing Serial No. 133,458.

The invention relates generally to threadless couplings and is more particularly directed to an improved coupling of this character especially adaptable for joining rod or shaft sections in a manner to transmit great compression, tension and torsion strains.

It is the principal object of the present invention to provide a threadless rod or shaft coupling which may be easily and quickly assembled and and disassembled; which, when assembled, will provide a rigid clutch connection preventing relative rotation and endwise movements of the adjacent sections; which will take up for wear of the component parts; and which will automatically compensate for radial contraction incident to elongation or stretch of the interlocking parts caused by heavy tension loads.

The invention is exemplified in the following description and illustrated by way of example in the accompany drawing, in which:

Fig. 1 is an elevation, partly in section, showing a coupling embodying the features of the present invention, and illustrating therewith a tool suitable for use in assembling or disassembling the coupling.

Fig. 2 is a disrupted elevation showing the several parts positioned ready for assembly.

Fig. 3 is an enlarged transverse section taken on the line III—III of Fig. 1 and illustrating a tool adaptable for use in expanding the coupling spring.

Fig. 4 is an enlarged transverse section taken on the line IV—IV of Fig. 1.

Fig. 5 is an enlarged transverse section taken on the line V—V of Fig. 1.

The specific embodiment shown in the drawing is one which is particularly adaptable for use in joining the adjacent ends of sucker rod lengths comprising the sucker rod of a deep well pump such as is employed for pumping an oil well.

It is a common practice to connect sucker rod lengths by means of pin and box screw-threaded connections, and it is common knowledge in the oil industry that such screw-threaded connections do frequently become unscrewed, and in very deep wells are often pulled apart by the heavy loads to which they are subjected. Various factors contribute to such sucker rod failure in deep oil wells.

Obviously the uppermost joint of a sucker rod string must support the weight of the entire string while each successive lower joint supports only the weight of that portion of the string which depends below it, each joint thus being subjected to a stretching tension dependent upon its longitudinal position in the string. Therefore, since each joint supports a different rod weight, each joint will, throughout both the upward pumping stroke and the return idle stroke, be stretched to a degree proportional to the rod weight it supports.

In addition to this variable stretching of the several rod joints due to the weight of the rod itself, there is an added stretching of the sucker rod which is due to the production load or the weight of the fluid column lifted by the pump plunger and which is exerted on the sucker rod string only on the upward pumping stroke, the sucker rod string being relieved of this production load upon the return stroke during which the fluid column is supported by the standing value of the pump and the pump plunger returns idly through the fluid to again pick up the fluid column for the succeeding pumping stroke.

Under these conditions there is a constant rod stretch variable throughout the length of the rod string and due to the rod weight, and a periodically added uniform rod stretch which is due to the production load and is effective only during the pumping stroke.

It is well known that the total stretch of a sucker rod employed in the pumping of a deep well may amount to as much as several feet. This can be readily understood considering the facts that a three thousand foot string of seven-eighths inch sucker rod weighs in excess of three and a half tons and that the production load of thirty degrees Baumé oil on a three and one-quarter inch pump at this depth is in excess of four and a half tons, making a total load of over eight tons.

As the production load is picked up at the beginning of each pumping stroke and is released at the end of each pumping stroke, there is a periodic loading and unloading of the sucker rod string which will cause said string to stretch and contract in concordance with the stroke rate of the pump.

Such periodic stretching and contracting of a sucker rod, which may have a frequency of from thirty to sixty times per minute, is recognized as being a major cause of the loosening and stripping of screw-threaded sucker rod joints or couplings.

For these and for other reasons it has long been considered desirable by those skilled in the oil producing industry to provide a sucker rod joint or coupling which will maintain a perfectly tight connection between adjacent rod lengths and will not become loosened by the substantially continuous stretching and contracting of the sucker rod string incident to the pumping operation, and which can be easily and quickly connected or disconnected.

The present invention provides a tight connection of the desired character which will support exceptionally heavy loads without pulling apart and which will also automatically take up for wear and for radial contraction due to elongation or stretch of the interlocking parts.

In the embodiment disclosed in the drawing, A designates the lower portion of an upper rod section and B designates the upper portion of an adjacent lower rod section. C and D designate opposed duplicate coupling members axially extended from the respective rod sections and formed integral therewith or rigidly connected thereto in any suitable manner. Each of these opposed coupling members is formed to provide a head 10 tapered axially and inwardly from its outer end and a shank 11 which is of reduced diameter to provide an intermediate abutment shoulder 12 and is also tapered axially and inwardly from said shoulder. The respective heads 10 and shanks 11 are preferably substantially square in cross section to provide groups of angularly related faces 13 and 14 and intermediate flattened corners 15. The adjacent end faces of the coupling members C and D are flat so as to fit each other when the rod sections are brought together in abutting engagement.

Surrounding the abutting coupling members C and D are the two half sections of a longitudinally split coupling sleeve 16 providing a longitudinal bore having internal walls contoured to closely fit the angularly related faces and abutment shoulders of the coupling members of two rod sections, the adjacent half sections when engaged with the headed coupling members being slightly separated from each other so as to at all times bear directly upon said coupling members.

The coupling sleeve 16 gradually tapers from one end to the other, and for the purpose of clamping its two sections tightly upon the abutting coupling members C and D of the adjacent rod sections, there is provided an outer retaining and clamping sleeve 17 having a bore longitudinally tapered to a degree corresponding to the tapered outer surface of the coupling sleeve 16 and of a diameter to snugly fit upon said coupling sleeve.

For the purpose of retaining the two half sections of the split coupling sleeve 16 on one of the headed coupling members prior to their engagement by the companion coupling member, said coupling sleeve is, near one end, provided with an external groove 18 in which is disposed a contractile split ring 19 that yieldingly retains the two half sections on said coupling member in a manner permitting separation of the opposite ends thereof for longitudinal insertion of the coupling member of the adjacent rod section.

One of the rod sections, the upper rod section A of the present embodiment, has an enlargement 20 adjacent the shank 11 of its coupling member C, the diameter of such enlargement being somewhat less than the smallest internal diameter of the retaining sleeve 17, and at the upper end of said enlargement the rod section has an external bead 21 providing a spring seat, the external diameter of said bead being slightly less than the smallest internal diameter of the outer retaining sleeve 17 so that said retaining sleeve may pass over both the enlargement 20 and the bead 21.

A coil spring 22 surrounds the enlargement 20 and bears against the spring seat formed by the bead 21, the opposite end of said spring engaging the upper adjacent end of the outer sleeve 17 and being centrally retained thereon by an annular lip 23 formed on said sleeve.

The opposed rod section, the lower rod section B of the present embodiment, has a shorter enlargement 24, similar in diameter to the enlargement 20 of the rod section A, and below this enlargement 24 the rod section B is provided with a guide flange 25, the diameter of which is greater than the external diameter of the outer retaining sleeve 17 and the under surface of which is suitably curved to guide the rod coupling safely down the bore of a well tubing.

Particular attention is directed to the relatively heavy compression spring 22 which constantly exerts a powerful downward pressure upon the outer tapered retaining or clamping sleeve 17 to tightly clamp the two half sections of the coupling sleeve 16 upon the two abutting headed coupling members of the adjacent rod sections. In forming this spring, the convolutions are wound to a slightly helical form, the upper flat coil being formed by bending the wire in reverse direction to provide a relatively short bend 26 spaced a short distance from the upper terminal end thereof, as shown in Fig. 2.

The reason this is done is that the spring must be passed longitudinally over the bead 21, both in assembling and in disassembling the coupling, and while the lower larger portion of the spring may easily pass over said bead, the upper smaller coil must be spread to enlarge its diameter before it can do so. The bend 26 and the adjacent end of the spring wire provide two opposed abutments between which may be inserted the opposed jaws of a pair of spreader pliers (as illustrated in Fig. 3) which may be used in expanding said spring.

A suitable tool 27 may be used for driving the sleeve 17 onto or off the coupling sleeve 16 and includes a U-shape head provided with a handle and adapted to be engaged either upon the enlargement 20, before the spring 22 is applied thereto, and along with force to drive the outer sleeve 17 onto the split clamping sleeve 16, or upon the enlargement 24 and slid along with force to drive said outer sleeve 17 off said split sleeve 16.

To connect two adjacent rod sections by means of a coupling or joint of the above character, the parts are conditioned as shown in Fig. 2, the free ends of the two half sections of the clamping sleeve 16 being suitably spread apart to permit insertion therein of the coupling member D of the lower rod section B. The two coupling members C and D being brought into abutting relationship within the split coupling sleeve 16, the outer retaining or clamping sleeve 17 will be slid axially upon said coupling sleeve and by means of the tool 27, or by any other suitable means, will be driven upon the coupling sleeve 16 and cause its two half sections to tightly grip the two coupling members C and D of the adjacent rod sections. The spring 22 will then be slid over the bead 21, with the use of the expanding pliers shown in Fig. 3, or using any other desired means capable of spreading the upper coil of the spring, to position said spring as shown in Fig. 1. Obviously a reverse operation will easily and quickly disconnect the coupling or joint.

While the illustrated embodiment involves coupling members substantially square in cross section, it will be understood that other cross sectional shapes capable of preventing relative rotation of the coupling members may be employed, and while the members C and D have been referred to as coupling members and the split sleeve as a coupling sleeve, said members are in fact clutch elements and said sleeve is in fact a clutch sleeve which cooperates with said clutch elements to prevent relative rotation of the two rod sections.

In the pumping of deep wells, it is very important that any tendency of one rod section to rotate relative to the adjacent rod sections must be prevented because of the fact that ability to rotate denotes play between the parts, and play between the parts occasions severe vibration, particularly at each end of every pump stroke as the pumping string is loaded and unloaded and as the pumping string comes to rest and its direction of travel is reversed. Nearly all deep wells are crooked, a perfectly plumb well being the exception rather than the rule, and it is due to the more or less wavy nature of a long pumping string that a torsional strain is ordinarily exerted on the sucker rod of a deep well. Further, it is important that longitudinal play between the parts of the rod string must be eliminated. In fact, since play of any kind or degree will cause vibrations of such nature as to cause crystallization and failure of the parts, it becomes vital that the parts comprising the rod couplings or joints be and remain, while in service, so tightly clamped together as to eliminate all chance of relative vibration or chatter.

In the coupling construction of the present invention, this is effectively accomplished by reason of the tapered angular cooperating surfaces of the two rod members and the split sleeve and the clamping function of the tapered retaining sleeve which under the driving influence of the heavy compression spring will be maintained in tight clamping engagement with the split clutch sleeve to force its two half sections to tight gripping engagement with the two coupling members or clutch elements of the adjacent rod sections, this arrangement being effective for taking up for wear of the respective parts.

Not only will the spring take up for wear of the parts, but it will also compensate for longitudinal stretch thereof, it being evident that coincident with stretch of the headed coupling members C and D and a consequent reduction in their cross sectional area, the axial driving force of the spring will be exerted to further translate the outer clamping sleeve and compress the two half sections of the split sleeve upon the transversely contracted coupling members. Thus, the spring functions to take up for wear of the parts and provides a means for automatically compensating for axial stretch of the connected rod sections in a manner to maintain a tight rigid connection.

While the present invention is herein disclosed in a preferred embodiment, it is to be understood that various changes may be made therein by those skilled in the art without departing from the spirit of the invention as defined in the appended claims.

Having thus described my invention, what I claim and desire to secure by Letters Patent is:

1. A coupling comprising headed coupling members adapted to be axially aligned in opposed relationship and having angularly related clutch faces, a coupling sleeve comprising opposed half sections each adapted to interlockingly embrace said coupling members and each having angularly related internal wall surfaces to match the angularly related clutch faces of said coupling members, contractile means tending to maintain said half sections in assembled relationship, and means for rigidly clamping said half sections on said coupling members.

2. A coupling for connecting two adjacent rod sections and comprising headed coupling members projecting axially from the respective rod sections and adapted to be axially aligned in opposed relationship, said members having angularly related faces, a longitudinally split coupling sleeve adapted to embrace said coupling members and having angularly related internal wall surfaces to match the angularly related faces of said coupling members and a gradually longitudinally tapered exterior surface, an outer clamping sleeve surrounding said split sleeve and having a gradually longitudinally tapered internal wall surface engaging the tapered exterior surface of said split sleeve and adapted for axial translation to rigidly clamp said split sleeve on said coupling members, one of said rod sections having an external bead providing a spring seat spaced from an end of said outer clamping sleeve, and a helical compression spring adapted to engage said spring seat and the adjacent end of said clamping sleeve and exert a translating tension on said sleeve.

3. A coupling for connecting two adjacent rod sections and comprising headed coupling members projecting axially from the respective rod sections and adapted to be axially aligned in opposed relationship, said members having angularly related faces, a longitudinally split coupling sleeve adapted to embrace said coupling members and having angularly related internal wall surfaces to match the angularly related faces of said coupling members and a gradually longitudinally tapered exterior surface, an outer clamping sleeve surrounding said split sleeve and having a gradually longitudinally tapered internal wall surface engaging the tapered exterior surface of said split sleeve and adapted for axial translation to rigidly clamp said split sleeve on said coupling members, one of said rod sections having an external bead providing a spring seat spaced from an end of said outer clamping sleeve, and a helical compression spring adapted to engage said spring seat and the adjacent end of said clamping sleeve and exert a translating tension on said sleeve, said spring having an end coil formed by bending the spring wire in a reverse helical direction to provide a relatively short bend and then circularly to within a short distance from said short bend to provide opposed abutments between which a spreading tool may be inserted to expand said end coil sufficiently for passage over said bead.

ADOLPH E. NIELSEN.